(12) United States Patent
Yoon et al.

(10) Patent No.: US 12,705,138 B2
(45) Date of Patent: Aug. 11, 2026

(54) OPERATION METHOD OF ELECTRONIC DEVICE

(71) Applicant: Samsung Electronics Co., Ltd., Suwon-si (KR)

(72) Inventors: Wondeuk Yoon, Suwon-si (KR); Woonki Lee, Suwon-si (KR); Junhwan Choi, Suwon-si (KR); Sangho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 86 days.

(21) Appl. No.: 18/765,381

(22) Filed: Jul. 8, 2024

(65) Prior Publication Data

US 2025/0061027 A1 Feb. 20, 2025

(30) Foreign Application Priority Data

Aug. 17, 2023 (KR) ........................ 10-2023-0107505

(51) Int. Cl.
*G06F 12/00* (2006.01)
*G06F 11/1446* (2026.01)

(52) U.S. Cl.
CPC ................................ *G06F 11/1448* (2013.01)

(58) Field of Classification Search
CPC ...... G06F 11/1448; G06F 3/061; G06F 3/065; G06F 11/1456; G06F 11/1451; G06F 11/1461; G06F 11/1464; G06F 9/44505; G06F 9/441; H04N 21/00; H04L 67/303
See application file for complete search history.

(56) References Cited

U.S. PATENT DOCUMENTS 10,055,180 B2 * 8/2018 Miura ....................... G06F 3/12
10,448,093 B2 10/2019 Zeng et al.
10,986,436 B2 4/2021 Schobel et al.
2010/0328689 A1 * 12/2010 Koo ...................... G06F 13/102 358/1.9
2016/0173046 A1 6/2016 Lee
2019/0028762 A1 1/2019 Zeng et al.
2019/0394558 A1 12/2019 Schobel et al.
2022/0322478 A1 * 10/2022 Ono .................... H04L 41/5058

FOREIGN PATENT DOCUMENTS

JP 4021217 B2 9/2003
KR 10-2010-0062057 A 6/2010
KR 10-2017-0023245 A 3/2017
KR 10-2017-0086223 A 7/2017
KR 10-1792142 B1 11/2017

* cited by examiner

*Primary Examiner* — Shawn X Gu

(74) *Attorney, Agent, or Firm* — Muir Patent Law, PLLC

(57) ABSTRACT

An embodiment of the present disclosure provides an operation method of an electronic device that stores a first setup value for a first function of an external device that stores setup backup data may include establishing a connection to the external device, receiving, in response to the establishing of the connection to the external device, a first setup backup value included in the setup backup data from the external device, and updating the first setup value based on the first setup backup value.

17 Claims, 15 Drawing Sheets

Figure 2:
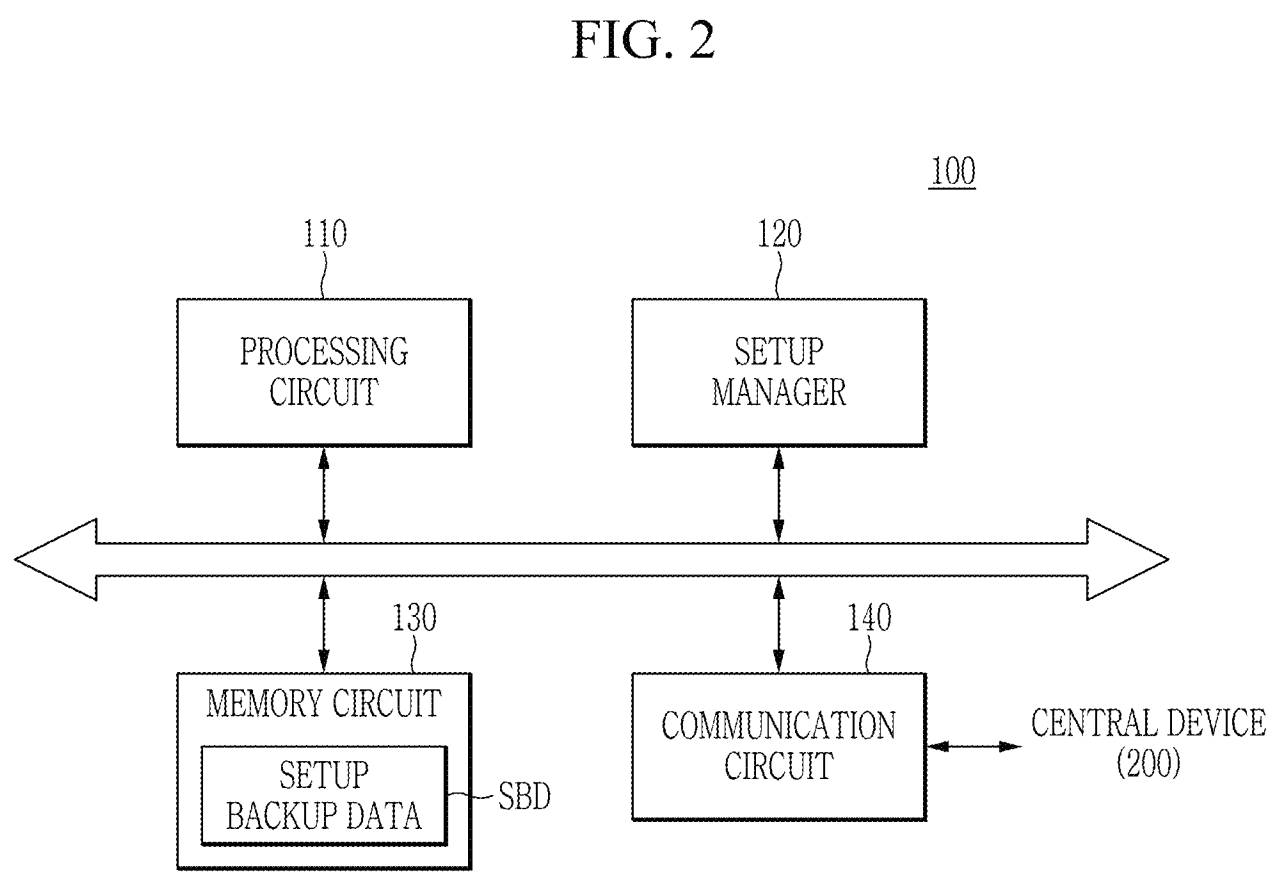

110 PROCESSING CIRCUIT

120 SETUP MANAGER

130 MEMORY CIRCUIT

SBD SETUP BACKUP DATA

140 COMMUNICATION CIRCUIT

CENTRAL DEVICE (200)

OPERATION METHOD OF ELECTRONIC DEVICE

CROSS-REFERENCE TO RELATED APPLICATION

This application claims priority to and the benefit of Korean Patent Application No. 10-2023-0107505 filed on Aug. 17, 2023 in the Korean Intellectual Property Office, the entire contents of which are herein incorporated by reference.

BACKGROUND

(a) Field

The present disclosure relates to an operation method of an electronic device. More specifically, the present disclosure relates to an operation method of a peripheral device that stores setup backup data and a central device that operates based on the setup backup data.

(b) Description

In a communication system, a user may provide information to a central device or receive information from the central device through a peripheral device. Therefore, user experience (UX) may be significantly influenced by the user's convenience when operating the peripheral device.

In a typical communication system, setup information about a function of a peripheral device may be stored in a central device. Therefore, as the central device connected to the peripheral device is changed, the setup information about the function of the peripheral device may be changed. For example, when the peripheral device is connected to a first central device, the function of the peripheral device may be determined based on first setup information stored in the first central device. On the other hand, when the peripheral device is connected to a second central device, the function of the peripheral device may be determined based on second setup information stored in the second central device. In this case, the function of the peripheral device may be changed whenever the peripheral device is connected to different central devices. Accordingly, when a user communicates with a plurality of central devices through one peripheral device, the user experience may be impaired.

SUMMARY

Various embodiments of the present disclosure provide an operation method of a peripheral device and a central device that may maintain setup information about a function of the peripheral device even if the central device connected to the peripheral device is changed.

An embodiment of the present disclosure provides an operation method of an electronic device that stores a first setup value for a first function of an external device that stores setup backup data. The operation method may include establishing a connection to the external device; receiving, in response to the establishing of the connection to the external device, a first setup backup value included in the setup backup data from the external device; and updating the first setup value based on the first setup backup value.

An embodiment of the present disclosure provides an operation method of an electronic device that stores setup backup data including a first setup backup value for a first function. The operation method may include establishing a first connection to a first central device storing a first setup value for the first function; and providing the first setup backup value to the first central device to update the first setup value with the first setup backup value in response to the first connection being established.

An embodiment of the present disclosure provides an operation method of an electronic device that communicates with an external device. The operation method may include establishing a connection to the external device; discovering services supported by the external device; determining whether the services include a device setup service; discovering, in response to the determining that the services include the device setup service, characteristics included in the device setup service; reading a value of a first characteristic that is one of the characteristics included in the device setup service; and controlling a first function of the external device based on the value of the first characteristic.

BRIEF DESCRIPTION OF THE DRAWINGS

FIG. 2 illustrates a detailed block diagram of a peripheral device 100 of FIG. 1.

DETAILED DESCRIPTION

Hereinafter, embodiments will be described in detail and clearly to such an extent that one skilled in the art easily carries out the present disclosure. The details such as components and structures described in the specification are merely provided to assist the overall understanding of embodiments. Therefore, it should be apparent to those skilled in the art that various changes and modifications of the embodiments described herein may be made without departing from the scope and spirit of the present disclosure. Moreover, the descriptions of well-known functions and structures are omitted for the sake of clarity and brevity. In the following drawings or in the detailed description, components may be connected to any other components except for components that are illustrated in drawings or are described in the detailed description. The terms described below are terms defined in consideration of the functions and are not limited to a specific function. The definitions of the terms should be determined based on the contents throughout the specification.

Components that are described in the detailed description with reference to the terms "driver", "controller", "block", etc. may be implemented with software, hardware, or a combination thereof. For example, the software may be a machine code, firmware, an embedded code, and application software. For example, the hardware may include an electrical circuit, an electronic circuit, a processor, a microprocessor, a computer, integrated circuit cores, a pressure sensor, an inertial sensor, a microelectromechanical system (MEMS), a passive element, or a combination thereof.

Figure 1:
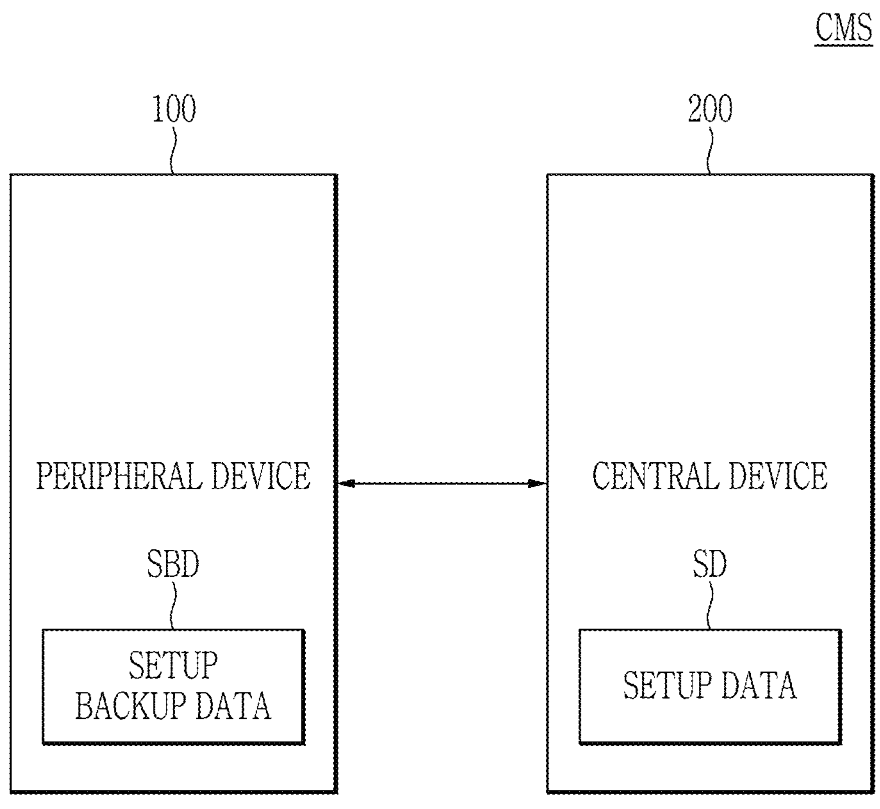
FIG. 1 illustrates a block diagram of a communication system according to an embodiment of present disclosure.

FIG. 1 illustrates a block diagram of a communication system according to an embodiment of present disclosure. Referring to FIG. 1, a communication system CMS may include a peripheral device 100 and a central device 200.

The peripheral device 100 and the central device 200 may wirelessly communicate with each other. For example, the peripheral device 100 and the central device 200 may wirelessly exchange control signals or data with each other.

In an embodiment, the peripheral device 100 and the central device 200 may communicate with each other based on one of various types of wireless communication protocols such as Bluetooth, Wi-Fi, ultra-wide band (UWB), radio frequency identification (RFID), and the like. However, hereinafter, an embodiment in which the peripheral device 100 and the central device 200 communicate with each other through Bluetooth will be representatively described. However, the scope of the present disclosure is not limited to a communication scheme between the peripheral device 100 and the central device 200. For example, the peripheral device 100 and the central device 200 may communicate based on any type of wired communication protocol.

In an embodiment, each of the peripheral devices 100 and central devices 200 may be any type of electronic device. For example, the peripheral device 100 may be one of various types of electronic devices such as a mouse, a keyboard, an earphone, a headset, a speaker, a laptop, a smartphone, a display device, a tablet PC, a remote controller, and the like. For the convenience of description, the peripheral device 100 is a human interface device (HID) such as a mouse, a keyboard, an earphone, a headset, or the like, and the central device 200 is a microcomputing device such as a smartphone, a tablet PC, or the like. However, the scope of the present disclosure is not limited to the types of the peripheral devices 100 and the central devices 200.

The central device 200 may store setup data SD. The central device 200 may control functions of the peripheral device 100 based on the setup data SD. For example, when the peripheral device 100 is a keyboard, the central device 200 may control the Caps-lock function, the Num-lock function, the language selection function, and the like of the peripheral device 100 based on the setup data SD. In an embodiment, when the peripheral device 100 is an earphone, the central device 200 may control the volume level adjustment function, the noise canceling function, the ambient sound function, and the like of the peripheral device 100.

The functions of the peripheral device 100 may be controlled based on the setup data SD stored in the central device 200. In this case, when the central device connected to the peripheral device 100 is changed, the functions of the peripheral device 100 will be controlled based on setup data stored in a newly connected central device (not shown). Accordingly, whenever the central device connected to the peripheral device 100 is changed, the functions of the peripheral device 100 may be changed, and thus user convenience may be impaired.

For a more detailed example, whenever the peripheral device 100 is connected to different central devices, the user may have to set the Caps-lock function, the num-lock function, and the language selection function repeatedly. Similarly, when the peripheral device 100 is an earphone, the central device 200 may need to set the volume level adjustment function, the noise canceling function, the ambient sound function, and the like of the peripheral device 100 repeatedly. Hereinafter, the configuration and operation of the communication system CMS in which the function of the peripheral device 100 remains constant even if the central device 200 connected to the peripheral device 100 is changed will be described in detail.

The peripheral device 100 may store setup backup data SBD. The setup backup data SBD may include setup backup values for various functions of the peripheral device 100. For example, when the peripheral device 100 is a keyboard, the setup backup data SBD may include various setup backup values indicating whether the Caps-lock function is turned on or off, whether the num-lock function is turned on or off, and the language to be selected through the language selection function. Similarly, when the peripheral device 100 is an earphone, the setup backup data SBD may include various setup backup values indicating a volume level, whether a noise canceling function is turned on or off, and whether an ambient sound listening function is turned on or off.

The peripheral device 100 may provide the setup backup data SBD to the central device 200 in response to being connected to the central device 200 (i.e., in response to paring between the central device 200 and the peripheral device 100). For example, the peripheral device 100 may provide the setup backup data SBD to the central device 200 in response to being paired with the central device 200. In an embodiment, the setup backup data SBD may be stored in the peripheral device 100 even before the connection between the peripheral device 100 and the central device 200 has been established.

The central device 200 may receive the setup backup data SBD. The central device 200 may update the setup data SD based on the setup backup data SBD. For example, in response to the connection between the peripheral device 100 and the central device 200 being established, the setup data SD of the central device 200 may be updated based on the setup backup data SBD.

The peripheral device 100 according to the embodiment of the present disclosure may store the setup backup data SBD for controlling its own functions. Accordingly, even if the peripheral device 100 is connected to another central device (not shown), the setup data of the newly connected central device may be updated based on the setup backup value stored in the setup backup data SBD. In this case, even if the central device 200 connected to the peripheral device 100 is changed, the function of the peripheral device 100 may be maintained constant, so the user experience (UX) may be improved.

In an embodiment, the setup backup data SBD stored in the peripheral device 100 may be updated based on user control. For example, the setup backup data SBD may be updated in response to the user controlling the peripheral device 100 or the central device 200 to change the function of the peripheral device 100. The update of the setup backup data SBD based on the user control will be described in more detail with reference to FIG. 4 and FIG. 5 below.

FIG. 2 illustrates a detailed block diagram of a peripheral device 100 of FIG. 1. Referring to FIG. 1 and FIG. 2, the peripheral device 100 may include a processing circuit 110, a setup manager 120, a memory circuit 130, and a communication circuit 140.

The processing circuit 110 may control overall operations of the peripheral device 100. For example, the processing circuit 110 may drive an operating system required for operations of the setup manager 120, the memory circuit 130, and the communication circuit 140. In an embodiment, the processing circuit 110 may include or may be a processor (i.e., a central processing unit (CPU)), for executing instructions of a computer program.

The setup manager 120 may manage the function setup of the peripheral device 100. For example, the setup manager 120 may store or update the setup backup data SBD in the memory circuit 130. In an embodiment, the setup manager 120 may control the memory circuit 130 to store or update the setup backup data SBD of the memory circuit 130.

The setup manager 120 can provide the setup backup data SBD to the central device 200 through the communication circuit 140. For example, the setup manager 120 may provide the setup backup data SBD to the central device 200 in response to establishment of a connection with the central device 200 (i.e., paring of the peripheral device 100 and the central device 200) through the communication circuit 140.

In an embodiment, the setup backup data SBD may be stored in the memory circuit 130 even before the connection with the central device 200 is established through the communication circuit 140.

In an embodiment, the setup manager 120 may be implemented as dedicated hardware module included in the peripheral device 100, or firmware that is stored in the memory circuit 130 and executed in the processing circuit 110. However, the scope of present disclosure is not limited to the implementation method of the setup manager 120. For example, the setup manager 120 may be implemented as software that is executed through the processing circuit 110 and the communication circuit 140.

In an embodiment, the communication circuit 140 may communicate with the central device 200 based on the Bluetooth protocol. In this case, the setup manager 120 may manage the setup backup data SBD based on a Bluetooth protocol-based service. A specific embodiment in which the setup manager 120 operates based on the Bluetooth protocol-based service will be described in more detail with reference to FIG. 6 to FIG. 13 below.

Figure 3:
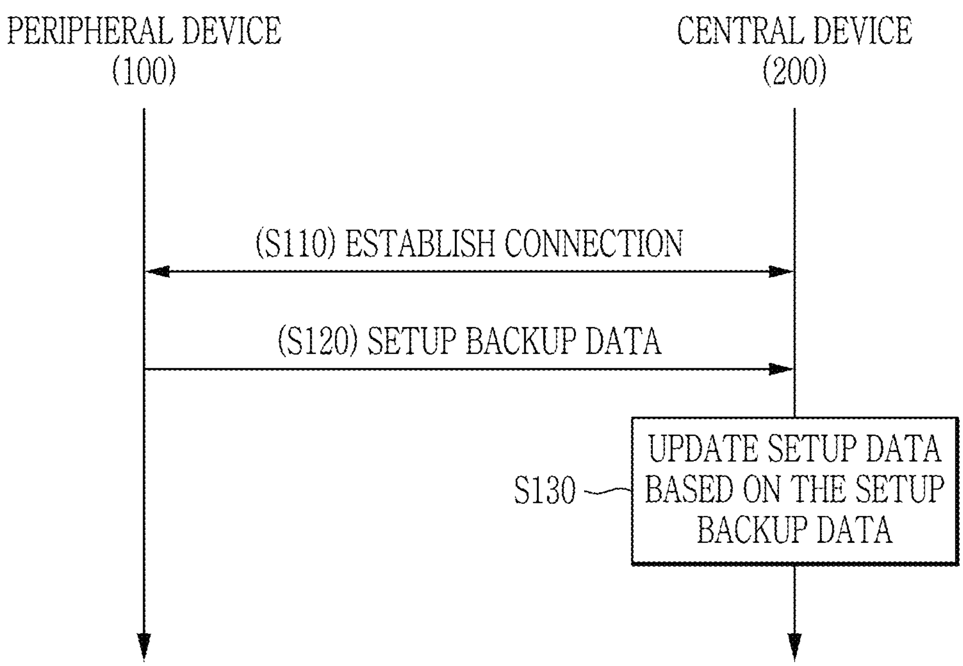
FIG. 3 illustrates a flowchart of an operation method of the communication system of FIG. 1 according to an embodiment of the present disclosure.

FIG. 3 illustrates a flowchart of an operation method of the communication system of FIG. 1 according to an embodiment of the present disclosure. Referring to FIG. 1 to FIG. 3, in step S110, a connection may be established between the peripheral device 100 and the central device 200. For example, the peripheral device 100 and the central device 200 may be paired with each other. In an embodiment, the peripheral device 100 and the central device 200 may be paired with each other using the Bluetooth protocol.

In step S120, the peripheral device 100 may provide the setup backup data SBD to the central device 200. For example, in response to the connection between the peripheral device 100 and the central device 200 being established, the setup manager 120 may provide the setup backup data SBD stored in the memory circuit 130 to the central device 200 through the communication circuit 140.

In step S130, the central device 200 may update the setup data SD based on the setup backup data SBD received from the peripheral device 100. For example, the central device 200 may update the setup values included in the setup data SD based on the setup backup values included in the setup backup data SBD. In this case, the function of the peripheral device 100 will be determined based on the updated setup data SD.

For a more detailed example, when the peripheral device 100 is a keyboard, the setup backup data SBD before step S110 is performed may include a setup backup value indicating 'turn-on' for the Caps-lock function. On the other hand, before step S110 is performed, the setup data SD may include a setup value indicating 'turn-off' for the Caps-lock function. In this case, in response to the peripheral device 100 and the central device 200 being paired with each other, the setup value for the Caps-lock function of the setup data SD may be updated to indicate 'turn-on'. In this case, the function of the peripheral device 100 (for example, the Caps-lock function) before and after pairing between the peripheral device 100 and the central device 200 may be maintained constantly, so user convenience may be increased. However, the scope of the present disclosure is not limited to the type of the peripheral device 100, the type of the setup backup data SBD, and the type of the setup data SD.

Figure 4:
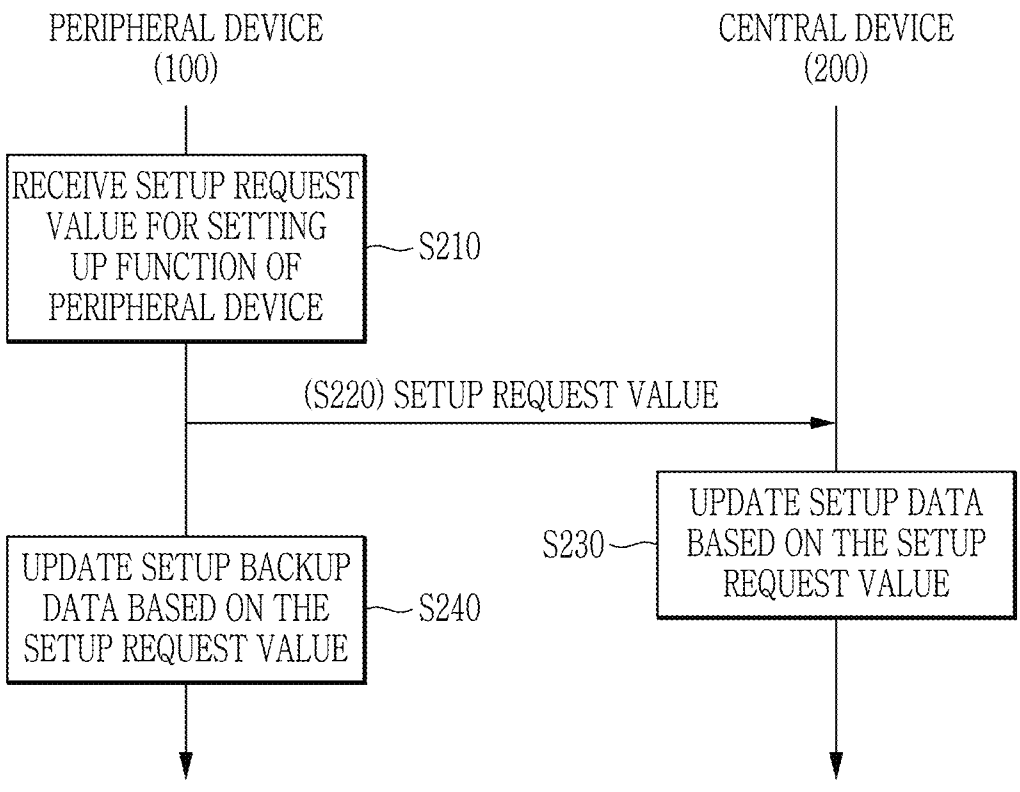
FIG. 4 illustrates a flowchart of an operation method of the communication system of FIG. 1 according to an embodiment.

FIG. 4 illustrates a flowchart of an operation method of the communication system of FIG. 1 according to an embodiment. Hereinafter, an embodiment in which a user controls the peripheral device 100 to change the function of the peripheral device 100 will be described with reference to FIG. 4.

Referring to FIG. 1 to FIG. 4, in step S210, the peripheral device 100 may receive a setup request value for setting up a function of the peripheral device 100 from the user. For example, when the peripheral device 100 is a keyboard, the peripheral device 100 may receive a setup request value for the Caps lock function from the user through Caps lock key input. In this case, the setup request value may indicate turn-on or turn-off. However, the scope of present disclosure is not limited thereto.

In step S220, the peripheral device 100 may transmit the setup request value to the central device 200.

In step S230, the central device 200 may update the setup data SD based on the setup request value. For example, the central device 200 may update the setup value for the Caps lock function according to the setup request value.

That is, in the following, even if the user inputs the setup request value to the peripheral device 100, the function of the peripheral device 100 is assumed to be controlled based on the setup data SD stored in the central device 200.

In step S240, the peripheral device 100 may update the setup backup data SBD based on the setup request value. For example, the setup manager 120 may update the setup value for the Caps lock function included in the setup backup data SBD according to the setup request value.

According to the embodiment of the present disclosure, when the user inputs the setup request value to the peripheral device 100, the setup manager 120 may update the setup backup data SBD by itself. However, the scope of the present disclosure is not limited thereto, and the setup backup data SBD may be updated in response to control of the central device 200. For example, the setup backup data SBD may be updated in response to an update request for the setup backup data SBD of the central device 200 after step S220.

The present disclosure is not limited to the sequence of step S230 and step S240 described above. In an embodiment, step S230 and step S240 described above may be performed in parallel.

Figure 5:
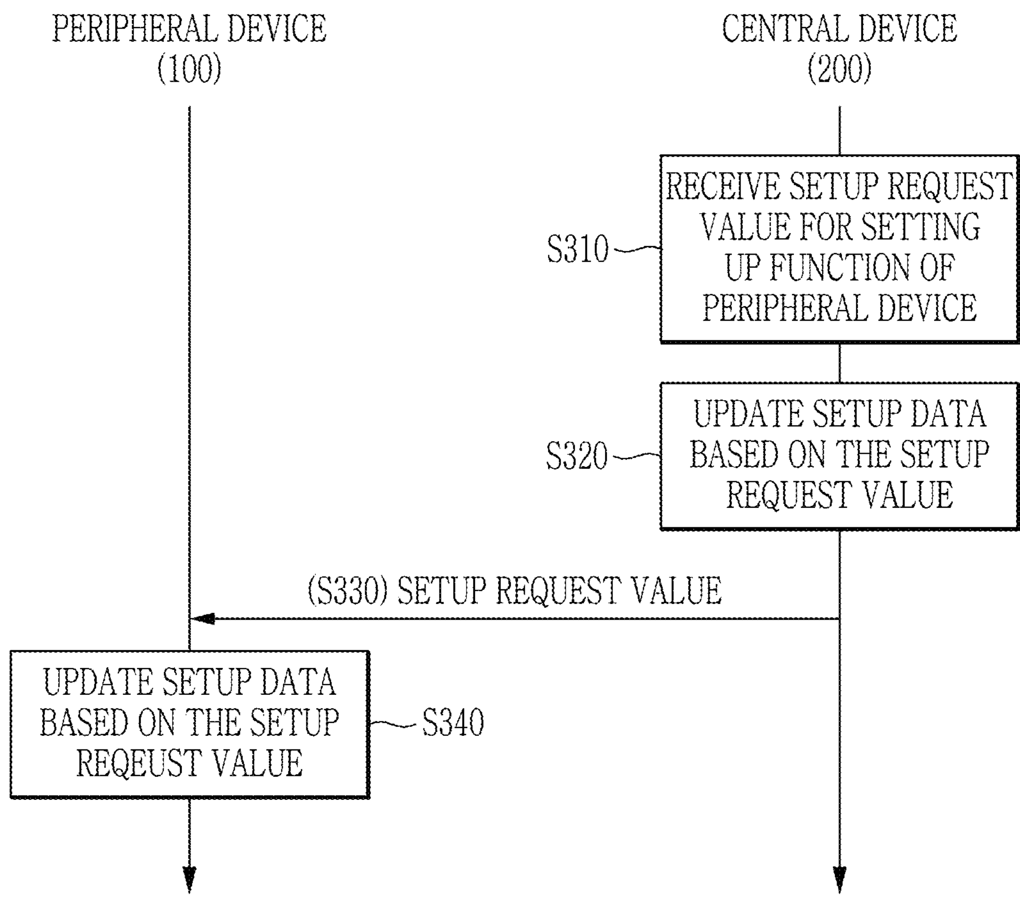
FIG. 5 illustrates a flowchart of an operation method of the communication system of FIG. 1 according to an embodiment.

FIG. 5 illustrates a flowchart of an operation method of the communication system of FIG. 1 according to an embodiment. Hereinafter, an embodiment in which a user controls the central device 200 to change the function of the peripheral device 100 will be described with reference to FIG. 5.

Referring to FIG. 1 to FIG. 5, in step S310, the central device 200 may receive a setup request value for setting up a function of the peripheral device 100 from the user. For example, when the central device 200 is a laptop and the peripheral device 100 is an earphone, the central device 200 may receive a setup request value for volume from the user through a volume level adjustment interface. In this case, the setup request value may indicate the volume level. However, the scope of present disclosure is not limited thereto.

In step S320, the central device 200 may update the setup data SD based on the setup request value. For example, the central device 200 may update the setup value for the volume level according to the setup request value.

In step S330, the central device 200 may transmit the setup request value to the peripheral device 100. For example, the central device 200 may provide the setup request value provided by the user to the peripheral device 100.

In step S340, the peripheral device 100 may update the setup backup data SBD based on the setup request value. For example, the setup manager 120 may update the setup backup value for the volume level included in the setup backup data SBD according to the setup request value.

According to the embodiment of the present disclosure, when the user inputs the setup request value through the central device 200, the central device 200 may provide the setup request value to the peripheral device 100. In this case, the setup manager 120 may update the setup backup data SBD based on the received setup request value.

In an embodiment, step S320 described above may be performed in parallel with step S330 to step S340. For example, step S320 described above may be performed between step S330 and step S340, or may be performed after step S340.

Figure 6:
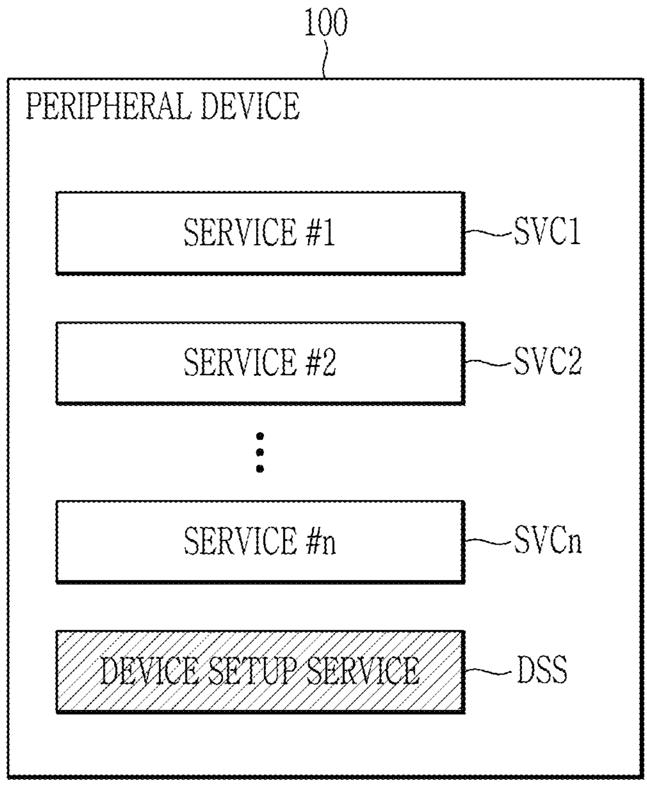
FIG. 6 illustrates a detailed block diagram of a peripheral device of FIG. 1 implemented based on a Bluetooth protocol.

FIG. 6 illustrates a detailed block diagram of a peripheral device of FIG. 1 implemented based on a Bluetooth protocol. Referring to FIG. 1 and FIG. 6, the peripheral device 100 may support a plurality of services. For example, the peripheral device 100 may support first to n-th services SVC1 to SVCn.

In an embodiment, the first to n-th services SVC1 to SVCn may be one of various types of Bluetooth services such as an HID service, a battery service, a device information service, and a scan parameter service.

The peripheral device 100 may support a device setup service (DSS). The peripheral device 100 may perform the storage, update, and provision operations of the setup backup data SBD according to the embodiment of the present disclosure through the device setup service DSS. However, the scope of present disclosure will not be limited to these terms.

In an embodiment, the device setup service DSS may be implemented based on the Generic Attribute Profile (GATT). The Generic Attribute Profile (GATT) is a specification within the Bluetooth Low Energy (BLE) protocol stack that defines how attributes are organized and exchanged between Bluetooth devices. GATT is used to enable communication and data exchange between devices, such as between a Bluetooth-enabled sensor and a smartphone and between the peripheral device 100 and the central device 200. In an embodiment, the first to n-th services SVC1 to SVCn may be defined in the specification of the GATT. In this case, the peripheral device 100 may be referred to as a GATT server device, and the central device 200 may be referred to as a GATT client device. However, the scope of present disclosure is not limited to these terms.

Figure 7:
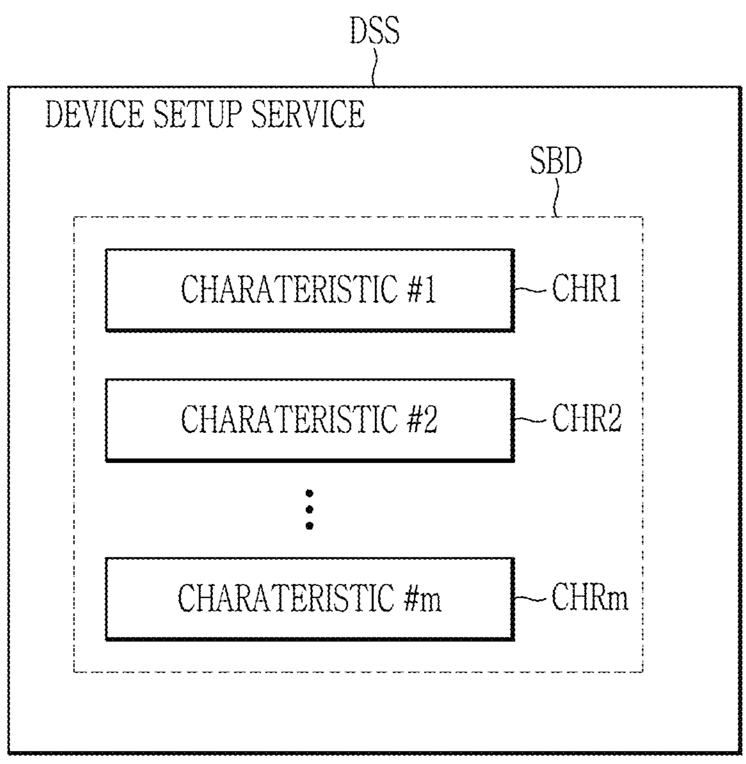
FIG. 7 illustrates a detailed block diagram of a device setup service of FIG. 6.

FIG. 7 illustrates a detailed block diagram of a device setup service of FIG. 6. Referring to FIG. 1, FIG. 6, and FIG. 7, the device setup service DSS may include a first to m-th characteristics CHR1 to CHRm.

Each of the first to m-th characteristics CHR1 to CHRm may correspond to a different function of the peripheral device 100. For example, each of the first to m-th characteristics CHR1 to CHRm may include setup backup values for different functions of the peripheral device 100. That is, the setup backup data SBD may include the first to m-th characteristics CHR1 to CHRm. A more detailed example of the first to m-th characteristics CHR1 to CHRm is described in more detail with reference to FIG. 8A to FIG. 8B below.

Figure 8A:
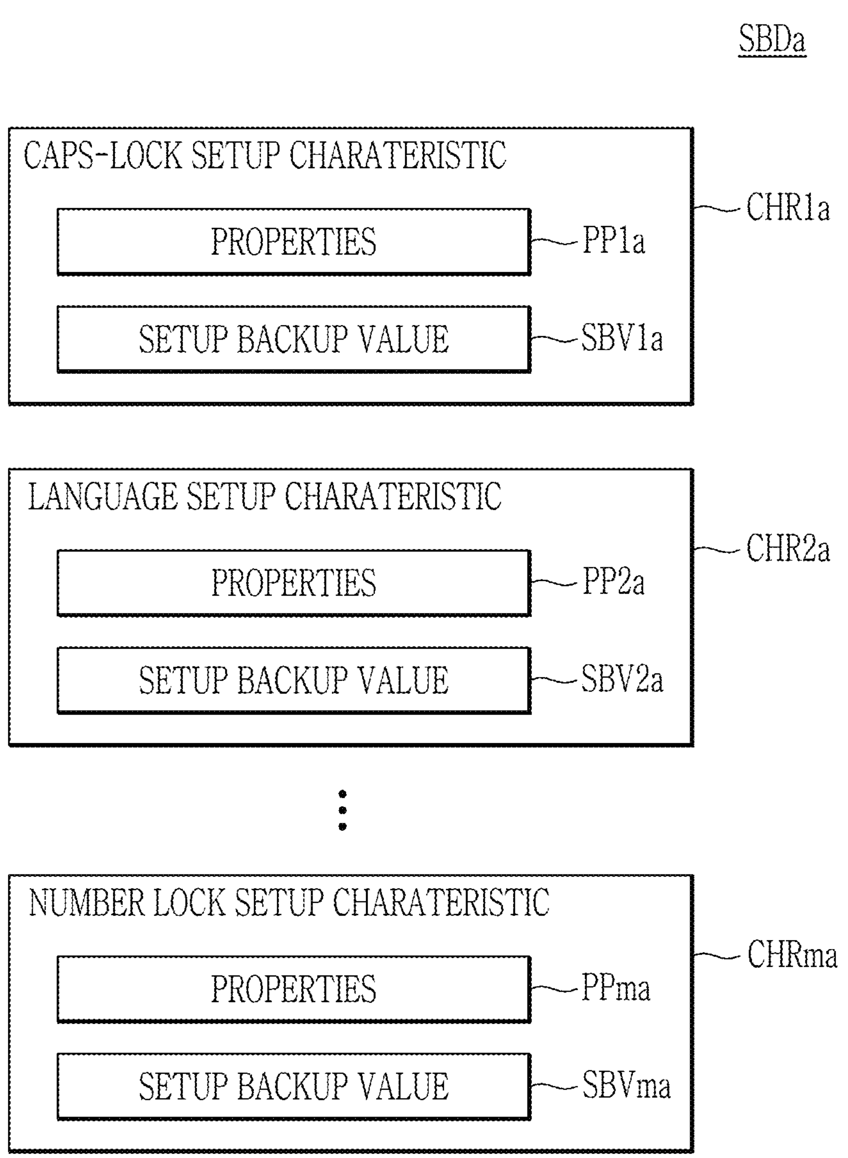
FIG. 8A and FIG. 8B illustrate block diagrams of examples of setup backup data of FIG. 7.
Figure 8B:
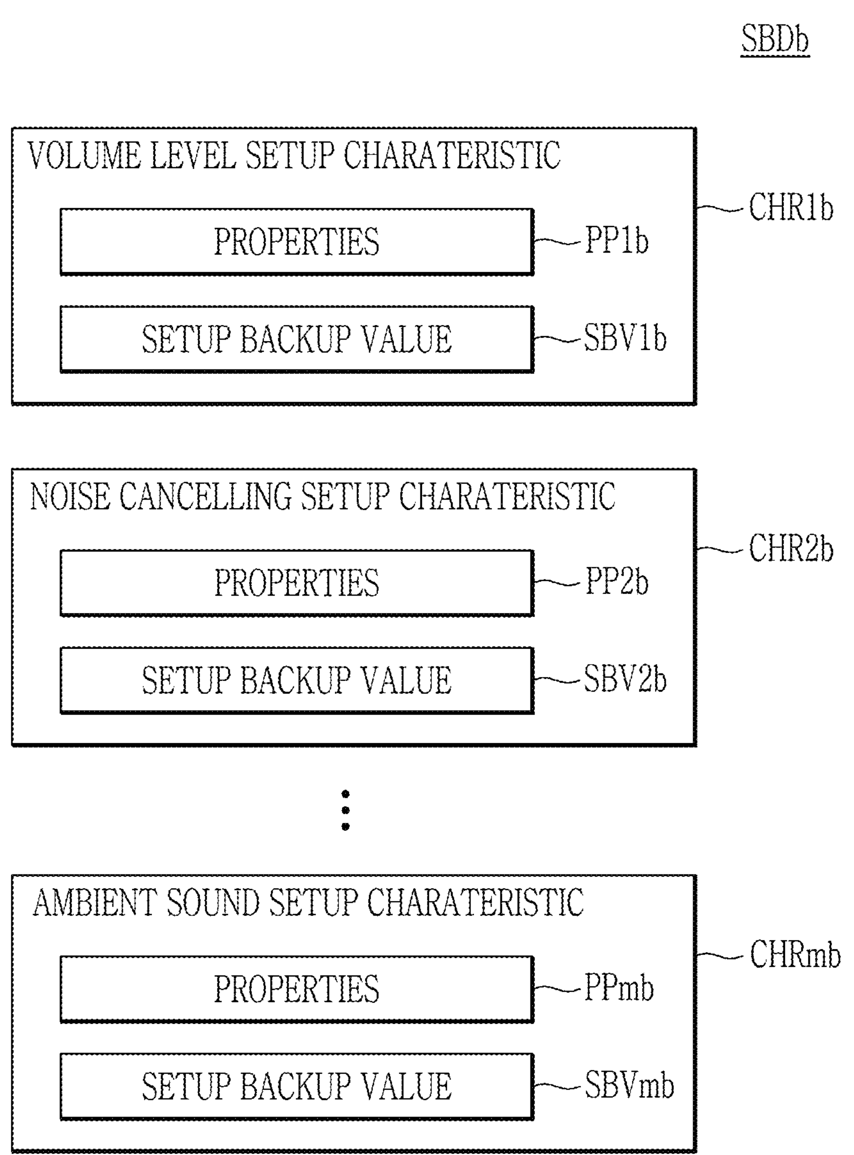

FIG. 8A and FIG. 8B illustrate block diagrams of examples of setup backup data of FIG. 7. Hereinafter, setup backup data SBDa for a keyboard as the peripheral device 100 will be described as an example with reference to FIG. 8A, and setup backup data SBDb for an earphone as the peripheral device 100 will be described as an example with reference to FIG. 8B. However, the scope of present disclosure is not limited thereto.

First, as shown in FIG. 1, FIG. 6, FIG. 7, and FIG. 8A, when the peripheral device 100 is a keyboard, the setup backup data SBDa may include first to m-th characteristics CHR1*a* to CHRma. Each of the first to m-th characteristics CHR1*a* to CHRma may include a setup backup value for different functions of the keyboard.

The first characteristic CHR1*a* may correspond to the setup of the 'Caps lock function' of the keyboard. The first characteristic CHR1*a* may be referred to as a 'Caps-lock setup characteristic'. In this case, a first setup backup value SBV1*a* included in the first characteristic CHR1*a* may indicate turn-on or turn-off. For example, the first setup back value SBV1*a* may be a flag value.

The second characteristic CHR2*a* may correspond to the 'language selection function' of the keyboard. The second characteristic CHR2*a* may be referred to as a 'language setup characteristic'. In this case, a second setup backup value SBV2*a* included in the second characteristic CHR2*a* may represent one of a plurality of languages that are supported by the peripheral device 100.

Similarly, the m-th characteristic CHRma may correspond to the 'Number lock function' of the keyboard. The m-th characteristic CHRma may be referred to as a 'number-lock key setup characteristic'. In this case, an m-th setup backup value SBVma included in the m-th characteristic CHRma may indicate turn-on or turn-off. For example, the m-th setup back value SBV1*ma* may be a flag value.

Each of the first to m-th characteristics CHR1*a* to CHRma may have one or more properties. In an embodiment, each of the first to m-th characteristics CHR1*a* to CHRma may have at least one of a read property and a write property, which will be described below. For example, the first to m-th characteristics CHR1*a* to CHRma may have first to m-th characteristics PP1*a* to PPma, respectively.

In an embodiment, each of the first to m-th characteristics CHR1*a* to CHRma may have a read property. In this case, the set backup value of each of the first to mth characteristics CHR1*a* to CHRma may be read from the peripheral device 100 upon request from the central device 200. For example, after the peripheral device 100 and the central device 200 are paired, each of the first to m-th setup backup values SBV1*a* to SBVma may be provided to the central device 200 in response to the request from the central device 200.

An embodiment in which the setup backup value included in the setup backup data SBD is read from the central device 200 will be described in more detail with reference to FIG. 10 below.

In an embodiment, each of the first to m-th characteristics CHR1*a* to CHRma may have a write property. In this case, the set backup value of each of the first to mth characteristics CHR1*a* to CHRma may be written to the peripheral device 100 upon request from the central device 200. For example, when the central device 200 receives a write request of the setup request value from the user, the central device 200 may write the received setup request value into one of the first to m-th setup backup values SBV1*a* to SBVma of the peripheral device 100.

An embodiment in which a setup backup value is written to the peripheral device 100 at the request of the central device 200 will be described in more detail with reference to FIG. 12 below.

In an embodiment, each of the first to m-th characteristics CHR1*a* to CHRma may further include an indicate property and/or a notify property. However, the scope of present disclosure is not limited thereto.

In an embodiment, each of the first to m-th characteristics CHR1*a* to CHRma may further include a descriptor. However, the scope of present disclosure is not limited thereto.

Next, as shown in FIG. 1, FIG. 6, FIG. 7, and FIG. 8B, when the peripheral device 100 is an earphone, the setup backup data SBDb may include first to m-th characteristics CHR1*b* to CHRmb. Each of the first to m-th characteristics CHR1*b* to CHRmb may include a setup backup value for different functions of the earphone.

The first characteristic CHR1*b* may correspond to the 'volume level adjustment function' of the earphone. The first characteristic CHR1*b* may be referred to as a 'volume level setup characteristic'. In this case, the first setup backup value SBV1*b* included in the first characteristic CHR1*b* may indicate the volume level.

The second characteristic CHR2*b* may correspond to the noise canceling setup of the earphone. The second characteristic CHR2*b* may be referred to as a 'noise canceling setup characteristic'. In this case, the second setup backup value SBV2*b* included in the second characteristic CHR2*b* may indicate one of turn-on or turn-off of the noise canceling function.

Similarly, the second characteristic CHRmb may correspond to the ambient sound listening setup of the earphones. That is, the m-th characteristic CHRmb may be an ambient sound setup characteristic'. In this case, the m-th setup backup value SBVmb included in the m-th characteristic CHRmb may indicate turn-on or turn-off of the ambient sound listening function. For example, the m-th setup back value SBV1*mb* may be a flag value.

Each of the first to m-th characteristics CHR1*b* to CHRmb may have one or more properties. For example, the first to m-th characteristics CHR1*a* to CHRma may have first to m-th characteristics PP1*a* to PPma, respectively. The operations of the peripheral device 100 and the central device 200 according to each of the first to m-th characteristics CHR1*b* to CHRmb are similar to those previously described with reference to FIG. 8A, so detailed descriptions thereof are omitted.

Figure 9:
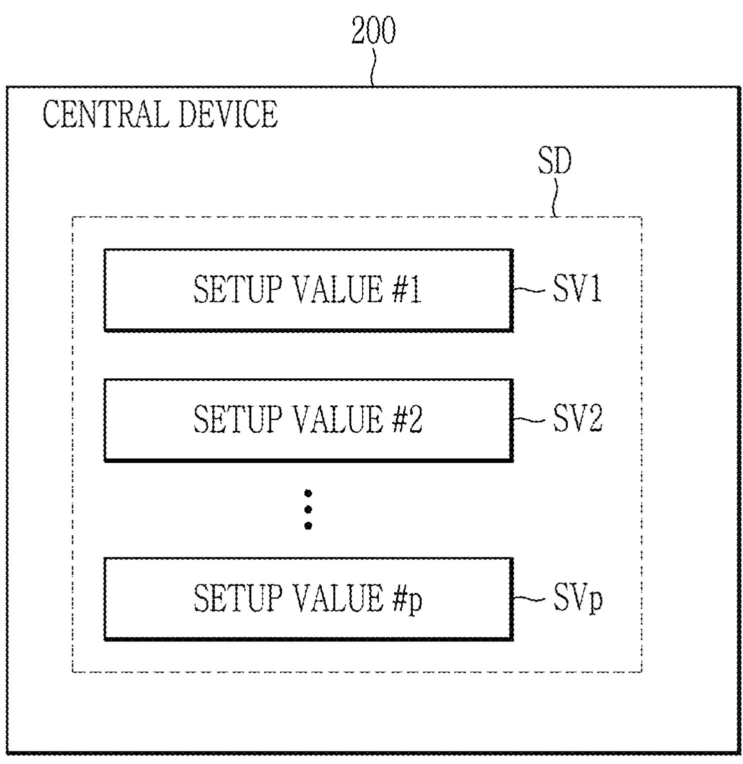
FIG. 9 illustrates a block diagram of a central device of FIG. 1 implemented based on a Bluetooth protocol.

FIG. 9 illustrates a block diagram of a central device of FIG. 1 implemented based on a Bluetooth protocol. Referring to FIG. 1, FIG. 6, FIG. 7, and FIG. 9, the central device 200 may store a plurality of setup values SV. For example, the central device 200 may store first to p-th setup values SV1 to SVp.

The central device 200 may control different functions of the peripheral device 100 through the first to p-th setup values SV1 to SVp. For example, the central device 200 may control the first function of the peripheral device 100 based on the first setup value SV1, and control the second function of the peripheral device 100 based on the second setup value SV2. For example, the setup data SD may include the first to p-th setup values SV1 to SVp.

Hereinafter, for a more concise description, an embodiment in which the peripheral device 100 is a keyboard (for example, an embodiment in which the setup backup data is implemented as the setup backup data SBDa described with reference to FIG. 8A) will be representatively described.

For example, the first function may be the 'caps lock function'. In this case, the first setup value SV1 may indicate turn-on or turn-off. The second function may be the 'language selection function'. In this case, the second setup value SV2 may represent one of the plurality of languages. However, the scope of present disclosure is not limited thereto.

In an embodiment, some of the first to p-th setup values SV1 to SVp may not correspond to the functions of the peripheral device 100. For example, each of the first to p-th setup values SV1 to SVp may correspond to a different function for a corresponding peripheral device of a plurality of peripheral devices which can be paired with the central device 200. However, the scope of present disclosure is not limited thereto.

Each of the first to p-th setup values SV1 to SVp may be updated based on the setup backup data SBD. For example, the central device 200 may update the corresponding setup value based on the characteristics included in the setup backup data SBD. For example, the central device 200 may update the first setup value SV1 based on the first setup backup value SBV1*a* of the setup backup data SBD. In addition, the central device 200 may update the second setup value SV2 based on the second setup backup value SBV2*a* of the setup backup data SBD.

Figure 10:
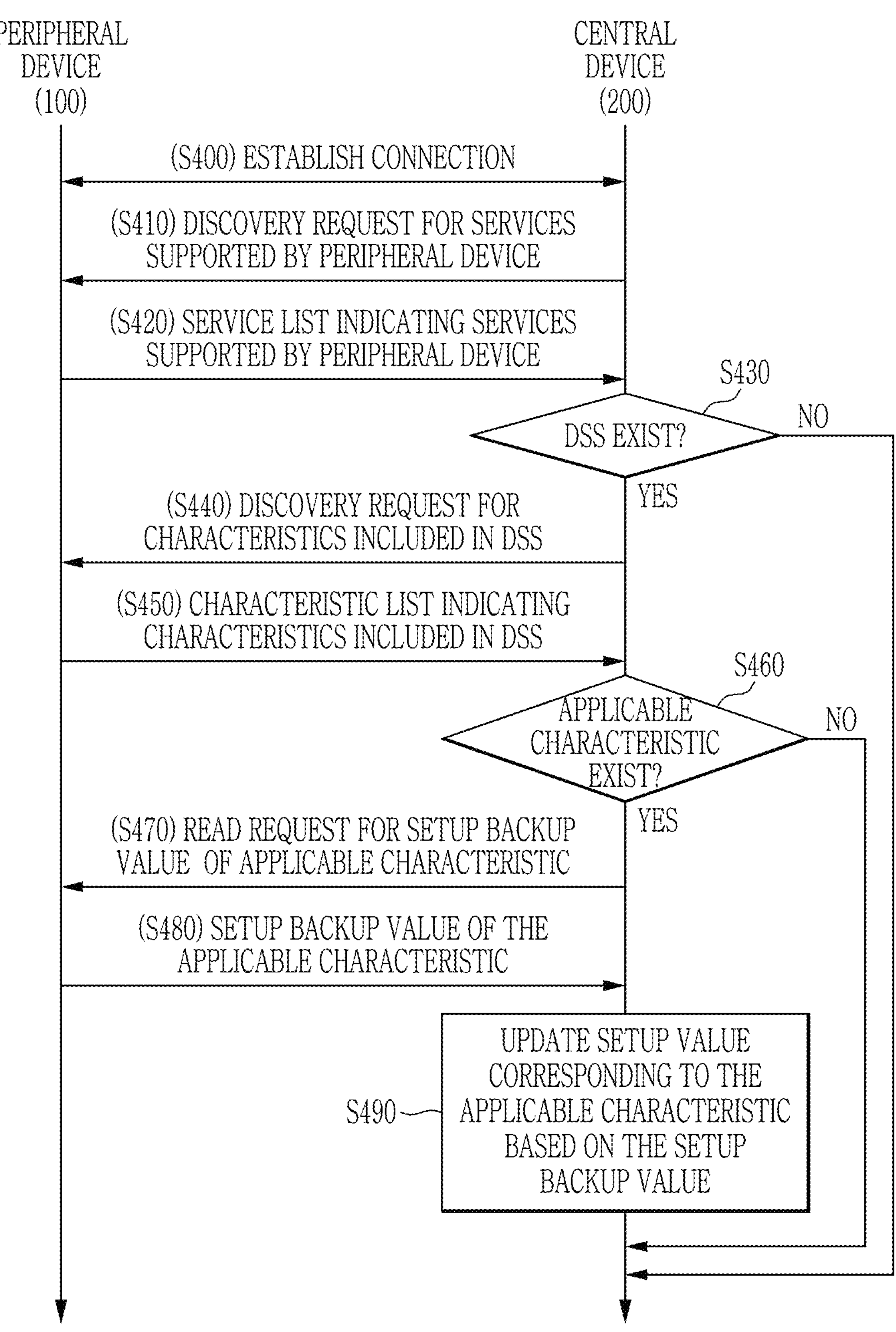
FIG. 10 illustrates a flowchart of an operation method of a communication system operating based on a Bluetooth protocol.

FIG. 10 illustrates a flowchart of an operation method of a communication system operating based on a Bluetooth protocol. Hereinafter, a method of operating the communication system CMS in which the peripheral device 100 and the central device 200 of FIG. 1 are implemented in a manner similar to the embodiment described with reference to FIG. 6 to FIG. 9 will be described.

Referring to FIG. 1 and FIG. 6 to FIG. 10, in step S400, a connection may be established between the peripheral device 100 and the central device 200. For example, the peripheral device 100 and the central device 200 may be paired with each other. In an embodiment, the peripheral device 100 and the central device 200 may be paired with each other using the Bluetooth protocol.

In step S410, the central device 200 may issue a discovery request for services supported by the peripheral device 100.

In step S420, the peripheral device 100 may return a service list indicating supported services to the central device 200. For example, the service list transmitted in step S420 may include the services previously described with reference to FIG. 6 (for example, the first to n-th services SVC1 to SVCn and the device setup service DSS).

After step S400 is performed, the central device 200 may discover the services supported by the peripheral device 100. The operation of the central device 200 will be described in more detail with reference to FIG. 13 below.

In step S430, the central device 200 may determine whether the device setup service DSS exists in the service list. For example, the central device 200 may determine whether the device setup service DSS is included in the service list received through step S420.

When it is determined that the device setup service DSS does not exist, the operation of the communication system CMS may be terminated. For example, when it is determined that the device setup service DSS does not exist, the peripheral device 200 may determine that the setup backup data SBD does not exist in the peripheral device 100.

When it is determined that the device setup service DSS exists, the following step S440 may be performed.

In step S440, the central device 200 may issue a discovery request for the characteristics included in the device setup service DSS.

In step S450, the peripheral device 100 may return the characteristic list indicating the characteristics included in the device setup service DSS to the central device 200. For example, the characteristic list transmitted in step S450 may include characteristics (for example, the first to m-th characteristics CHR1 to CHRm) described above with reference to FIG. 7.

After step S430 is performed, the central device 200 may discover the characteristics included in the device setup service DSS. The operation of the central device 200 will be described in more detail with reference to FIG. 13 below.

In step S460, the central device 200 may determine whether an applicable characteristic exists in the characteristic list. For example, the central device 200 may determine whether the characteristic list received through step S450 includes a characteristic applicable to the central device 200.

In an embodiment, the applicable characteristic may be determined based on the setup values (that is, the first to p-th setup values SV1 to SVp) included in the central device 200. For example, among the characteristics included in the setup backup data SBD, a characteristic corresponding to a same function as one of the first to p-th setup values SV1 to SVp may be referred to as an applicable characteristic. On the other hand, a characteristic corresponding none of the functions controlled through the first to p-th setup values SV1 to SVp may be referred to as inapplicable characteristics.

In an embodiment, the applicable characteristic may be determined based on the type of central device 200. For example, when the peripheral device 100 is an earphone and the central device 200 is a smartphone, the central device 200 may use most of the characteristics stored in the peripheral device 100 (for example, the volume level setup characteristic, the noise canceling setup characteristic, the ambient sound listening setup characteristic, and the like). On the other hand, when the peripheral device 100 is an earphone and the central device 200 is a display device, the central device 200 may not be able to use the characteristic corresponding to the phone function among the characteristics stored in the peripheral device 100. However, the scope of the present disclosure is not limited to these specific embodiments.

When it is determined that the applicable characteristic does not exist in the device setup service DSS, the operation of the communication system CMS may be terminated. For example, when the applicable characteristic does not exist in the device setup service DSS, the central device 200 may determine that there is no setup backup data SBD to be received from the peripheral device 100.

When it is determined that the applicable characteristic exists in the device setup service DSS, the following step S470 may be performed.

In step S470, the central device 200 may issue a read request to the peripheral device 100 for a setup backup value of the applicable characteristic.

In step S480, the peripheral device 100 may return the setup backup value of the applicable characteristic described above to the central device 200. For example, when the read request provided in step S470 refers to the first characteristic CHR1*a* described above with reference to FIG. 8A, the peripheral device 100 may return the first setup backup value SBV1*a*.

In step S490, the central device 200 may update the setup value based on the received setup backup value. For example, when the central device 200 receives the first setup backup value SBV1*a*, the central device 200 may update the first setup value SV1 that corresponds to the first setup backup value SBV1*a*.

According to the embodiment of the present disclosure, in response to the pairing of the peripheral device 100 and the central device 200, the setup value for the peripheral device 100 stored in the central device 200 may be updated based on the setup backup value stored in the peripheral device 100. Therefore, according to the embodiment of the present disclosure, the operation of the peripheral device 100 may be maintained constant, so user convenience may be improved.

In an embodiment, when the setup backup data SBD includes a plurality of applicable characteristics to the central device 200, step S470 to step S490 described above may be performed repeatedly. In this case, based on the plurality of setup backup values, the setup values included in the setup data SD may be sequentially updated.

Figure 11:
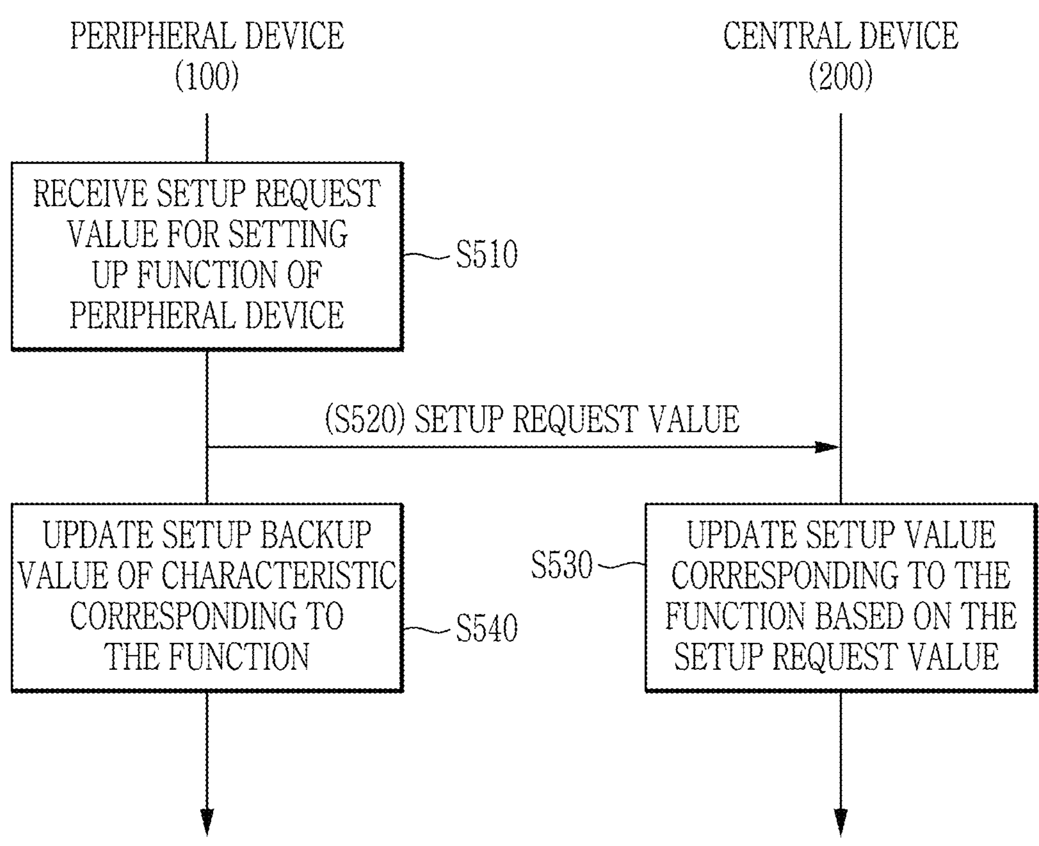
FIG. 11 illustrates a flowchart of an operation method according to an embodiment of a communication system operating based on a Bluetooth protocol.

FIG. 11 illustrates a flowchart of an operation method according to an embodiment of a communication system operating based on a Bluetooth protocol. Hereinafter, an embodiment in which a user controls the peripheral device 100 to change the function of the peripheral device 100 will be described.

Referring to FIG. 1 and FIG. 6 to FIG. 11, in step S510, the peripheral device 100 may receive a setup request value for setting up a function of the peripheral device 100 from the user. For example, when the peripheral device 100 is a keyboard, the peripheral device 100 may receive a setup request value for the 'Caps lock function' from the user through 'Caps lock key' input.

In step S520, the peripheral device 100 may transmit the setup request value to the central device 200. Step S510 and step S520 are similar to step S210 and step S220 described above, so detailed descriptions thereof will be omitted.

In step S530, the central device 200 may update a setup value corresponding to a changed function based on the setup request value (hereinafter referred to as a 'changed function'). For example, the central device 200 may update the first setup value SV1 for the 'Caps lock function' according to the setup request value.

In step S540, the peripheral device 100 may update a setup backup value of a characteristic corresponding to the changed function. For example, the peripheral device 100 may update the first setup backup value SBV1*a* included in the setup backup data SBDa according to the setup request value.

The steps S530 and S540 may be sequentially performed. The present disclosure is not limited to the sequence of step S530 and step S540 as described above. In an embodiment, the steps S530 and S540 described above may be performed in parallel.

Figure 12:
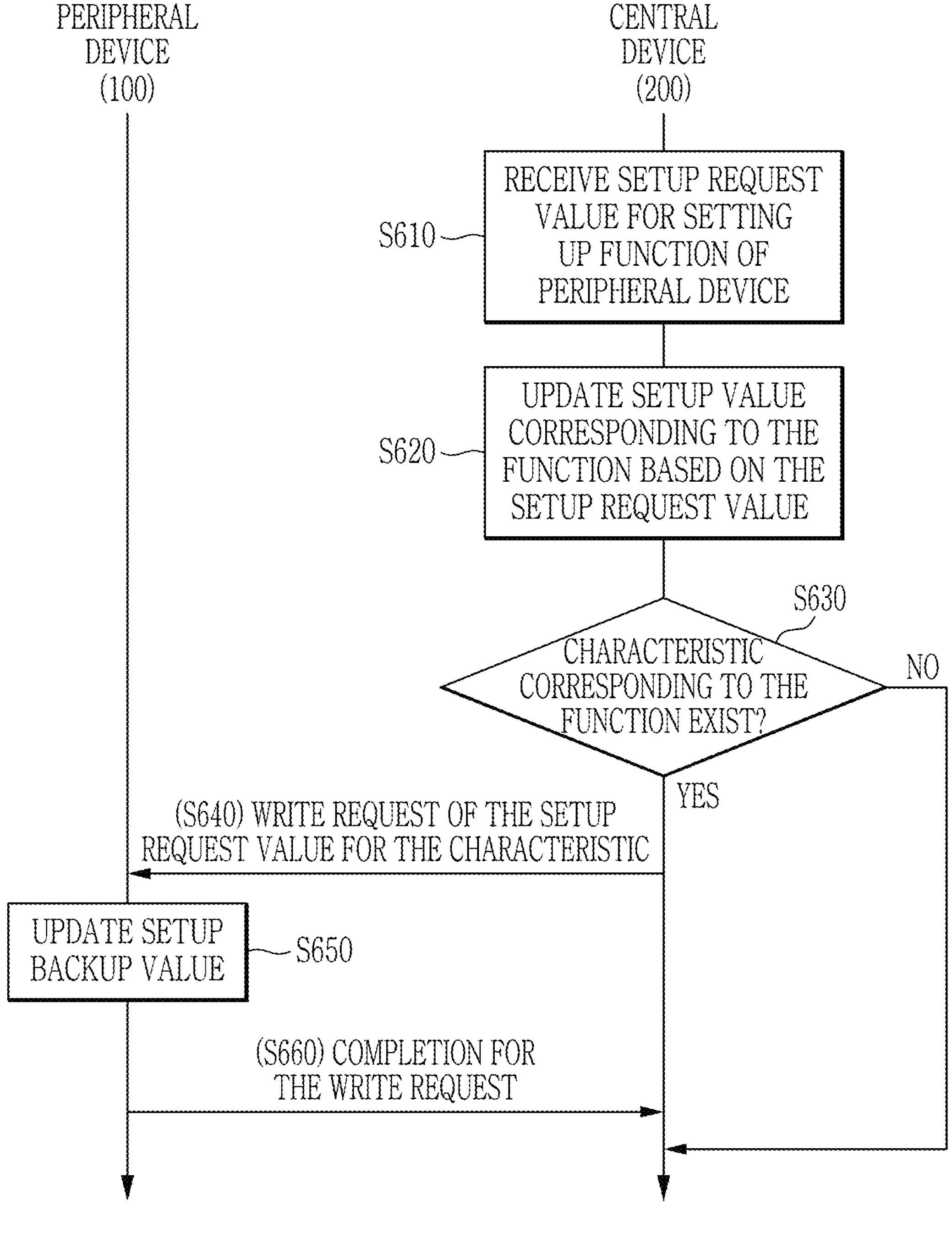
FIG. 12 illustrates a flowchart of an operation method according to an embodiment of a communication system operating based on a Bluetooth protocol.

FIG. 12 illustrates a flowchart of an operation method according to an embodiment of a communication system operating based on a Bluetooth protocol. Hereinafter, an embodiment in which a user controls the central device 200 to change the function of the peripheral device 100 will be described.

Referring to FIG. 1 and FIG. 6 to FIG. 12, in step S610, the central device 200 may receive a setup request value for setting up a function of the peripheral device 100 from the user. For example, when the central device 200 is a laptop, the central device 200 may receive a setup request value for a volume level from the user through a volume adjustment interface. In this case, the setup request value may indicate an amount of the volume. However, the scope of present disclosure is not limited thereto.

In step S620, the central device 200 may update a setup value corresponding to a changed function based on the setup request value (hereinafter referred to as a 'changed function'). For example, the central device 200 may update the first setup value SV1 for the 'volume level adjustment function' according to the setup request value.

In step S630, the central device 200 may determine whether the characteristic corresponding to the changed function exists in the setup backup data SBD.

Hereinafter, for a more concise description, in step S630, it is assumed that the central device 200 determines whether the characteristic corresponding to the changed function exists in the setup backup data SBD based on the characteristic list provided through step S450 described above. That is, the central device 200 may perform step S630 based on the characteristics discovered from the peripheral device 100 immediately after pairing with the peripheral device 100. However, the scope of the present disclosure is not limited thereto, and the central device 200 may be configured to repeatedly perform step S410 to step S450 described above before performing step S630.

When it is determined that the setup backup data SBD does not include the characteristics corresponding to the changed function, the operation of the communication system may be terminated. For example, when the peripheral device 100 is a keyboard, the setup backup data SBD may not include a characteristic corresponding to the volume level adjustment function. In this case, the central device 200 may not provide the setup request value to the peripheral device 100.

When it is determined that the characteristic corresponding to the changed function exists in the setup backup data SBD, the following step S640 may be performed.

In step S640, the central device 200 may issue a write request of the setup request value to the peripheral device 100 for the characteristic corresponding to the changed function. For example, the central device 200 may provide the write request of the setup request value to the peripheral device 100.

In an embodiment, step S620 and step S630 may correspond to step S330 described above. For example, when the communication system CMS operates based on the Bluetooth protocol, step S330 described above may include step S620 and step S630. However, the scope of present disclosure is not limited thereto.

In step S650, the peripheral device 100 may update the corresponding setup backup value based on the setup request value. For example, the peripheral device 100 may update the characteristic value (that is, the setup backup value) corresponding to the changed function according to the setup request value.

In step S660, the peripheral device 100 may transmit a completion signal for the write request.

Figure 13:
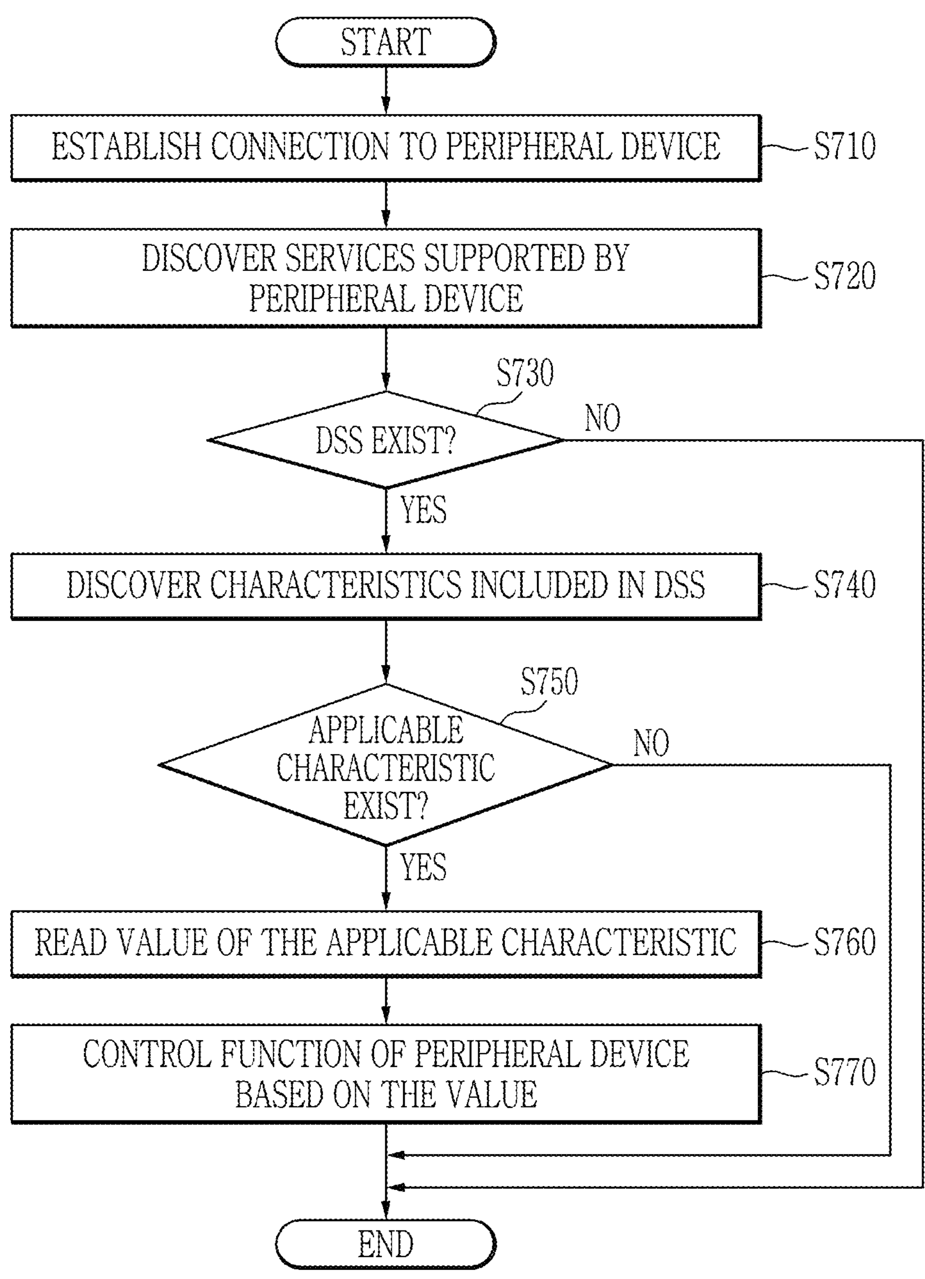
FIG. 13 illustrates a flowchart of an operation method of a central device implemented based on a Bluetooth protocol.

FIG. 13 illustrates a flowchart of an operation method of a central device implemented based on a Bluetooth protocol. Referring to FIG. 1 and FIG. 6 to FIG. 13, in step S710, device 200 may establish a connection to the peripheral device 100.

In step S720, the central device 200 may discover services supported by the peripheral device 100. For example, the central device 200 may transmit a discovery request for the services supported by the peripheral device 100. In this case, step S410 and step S420 described above will be performed.

In step S730, the central device 200 may determine whether the device setup service DSS is included among the discovered services. Step S730 is similar to step S430 described above, so a detailed description thereof will be omitted.

When the device setup service DSS is included among the discovered services, the following step S740 may be performed. When the device setup service DSS is not included among the discovered services, the operation of the central device 200 may be terminated.

In an embodiment, the central device 200 may selectively use the device setup service DSS supported by the peripheral device 100. For example, even if the peripheral device 100 supports the device setup service DSS, the central device 200 may be implemented not to read the setting backup data SBD from the peripheral device 100. For example, a step of determining whether the central device 200 will use the device setup service DSS may be further included between step S730 and step S740. However, the scope of present disclosure is not limited thereto.

In step S740, the central device 200 may discover characteristics supported by the device setup service DSS. For example, the central device 200 may transmit a characteristic discovery request for the characteristics included in the device setup service DSS. In this case, step S440 and step S450 described above will be performed.

In step S750, the central device 200 may determine whether the device setup service DSS includes the applicable characteristic. Step S750 is similar to step S460 described above, so a detailed description thereof will be omitted.

When the device setup service DSS includes the applicable characteristic, the following step S760 may be performed. When the device setup service DSS does not include the applicable characteristic, the operation of the central device 200 may be terminated.

In step S760, the central device 200 may read the value of the applicable characteristic. For example, the central device 200 may transmit a read request for the value of the characteristic determined to be applicable to the peripheral device 100. For example, the central device 200 may read the setup backup value of the characteristic determined as applicable. In this case, step S470 and step S480 described above will be performed.

In step S770, the central device 200 may control the function of the peripheral device 100 based on the read value. For example, the central device 200 may control the function corresponding to the read value of the peripheral device 100. For example, the central device 200 may update a setup value (for example, a setup value corresponding to the applicable characteristic) corresponding to the read value. In this case, the central device 200 may control the functions of the peripheral device 100 based on the setup backup value included in the setting backup data SBD. Therefore, according to the embodiment of the present disclosure, the user convenience of the communication system CMS may be increased.

Figure 14:
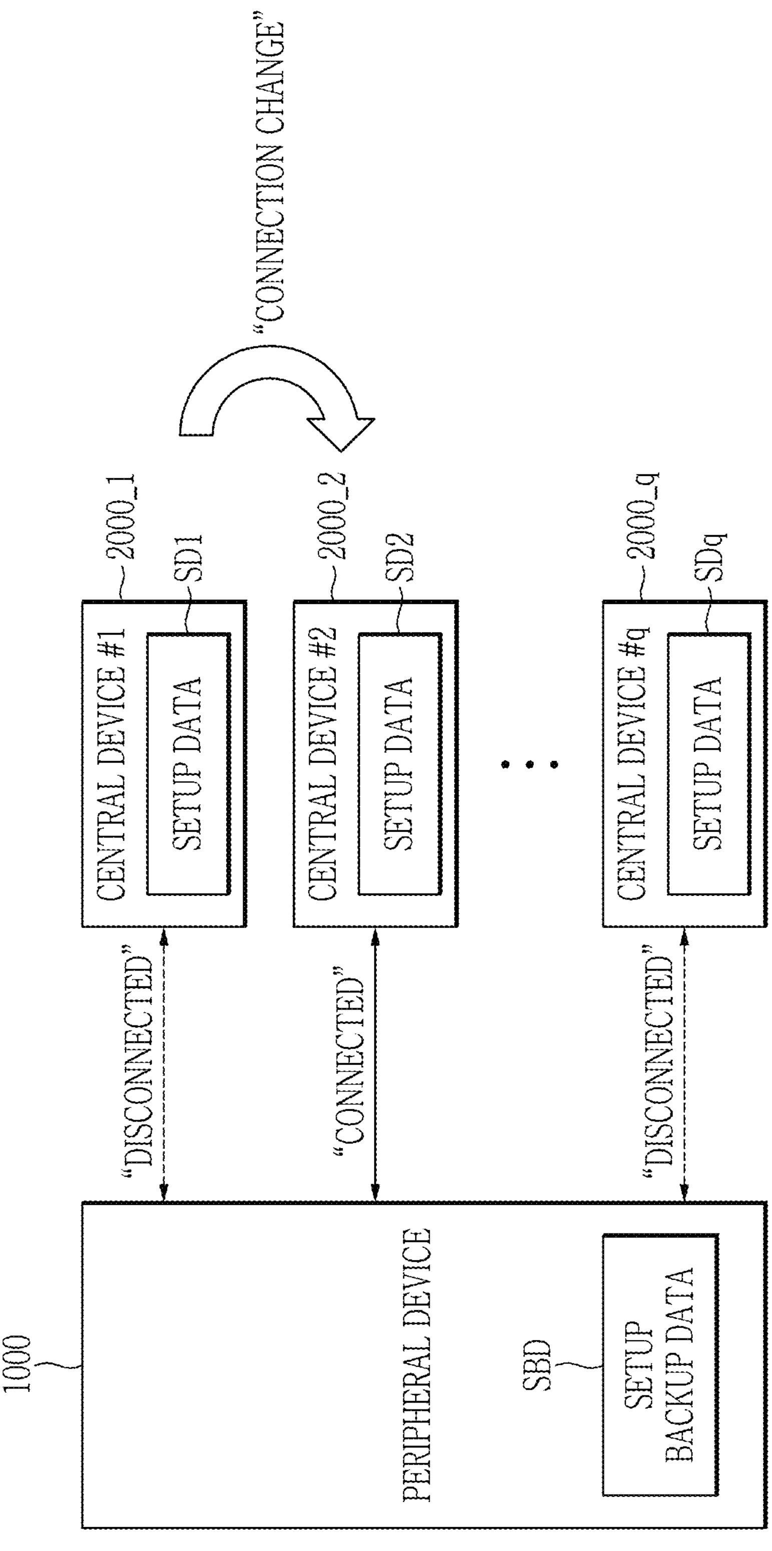
FIG. 14 illustrates a block diagram of an operation of a communication system according to an embodiment of present disclosure.

FIG. 14 illustrates a block diagram of an operation of a communication system according to an embodiment of present disclosure. Referring to FIG. 1 to FIG. 14, the communication system CMS may include one peripheral device 1000 and a plurality of central devices 2000. For example, the communication system CMS may include the peripheral device 1000 and first to q-th central devices 2000_1 to 2000_$q$.

The peripheral device 1000 may be implemented in a similar manner to the peripheral device 100 previously described with reference to FIG. 1 to FIG. 13. Each of the first to q-th central devices 2000_1 to 2000_$q$ may be implemented in a similar manner to the central device 200 previously described with reference to FIG. 1 to FIG. 13. In this case, the user convenience of the communication system CMS may be improved. Hereinafter, a more detailed configuration and operation of the communication system CMS including the peripheral device 1000 and the first to q-th central devices 2000_1 to 2000_$q$ will be described.

The first to q-th central devices 2000_1 to 2000_$q$ may store different setup data, respectively. For example, the first to q-th central devices 2000_1 to 2000_$q$ may store first to q-th setup data SD1 to SDq, respectively. Hereinafter, for a more concise description, it is assumed that each of the first to q-th setup data SD1 to SDq includes a setup value corresponding to the first function of the peripheral device 100.

Each of the first to q-th central devices 2000_1 to 2000_$q$ may exclusively control the first function of the peripheral device 100. For example, when the first central device 2000_1 is connected to the peripheral device 1000, the first central device 2000_1 may exclusively control the first function of the peripheral device 1000. In this case, the second to q-th central devices 2000_2 to 2000_$q$ may not be able to control the first function of the peripheral device 1000. Conversely, when the second central device 2000_2 is connected to the peripheral device 1000, the second central device 2000_2 may exclusively control the first function of the peripheral device 1000.

The peripheral device 1000 may store the setup backup data SBD. When the peripheral device 1000 is connected to the first central device 2000_1, the first setup data SD1 may be synchronized with the setup backup data SBD. For example, when the peripheral device 1000 is connected to the first central device 2000_1, the first setup data SD1 may be synchronized with the setup backup data SBD in the manner described above with reference to FIG. 3 to FIG. 5.

The second setup data SD2 may be different from the first setup data SD1. For example, the first setup data SD1 may store a setup value indicating turn-on for the 'Caps lock function', and the second setup data SD2 may store a setup value indicating turn-off for the 'Caps lock function'.

In an embodiment, when the peripheral device SBD does not store the setup backup data SBD, as the user disconnects the peripheral device 1000 and the first central device 2000_1 and connects the peripheral device 1000 and the second central device 2000_2, the function of the peripheral device 1000 may be changed. For example, as the central device connected to the peripheral device 1000 is changed, the 'Caps lock function' of the peripheral device 1000 may be turned on or off. In this case, since the function of the peripheral device 1000 may be changed regardless of the user's operation of the peripheral device 1000, the user's convenience may be impaired.

In an embodiment, when the peripheral device SBD stores the setup backup data SBD, as the user disconnects the peripheral device 1000 and the first central device 2000_1 and connects the peripheral device 1000 and the second central device 2000_2, the second setup data SD2 may be updated based on the setup backup data SBD. For example, the second setup data SD2 may be synchronized with the setup backup data SBD in the manner described above with reference to FIG. 3. In this case, in response to a change in the central device connected to the peripheral device 1000, the setup data of the newly connected central device is updated based on the setup backup data SBD, so that the function of the peripheral device 1000 may maintained constantly. Therefore, according to the embodiment of the present disclosure, the user convenience may be improved.

The above-described contents are specific embodiments for implementing the present disclosure. The present disclosure will include not only the above-described embodiments, but also embodiments that may be simply design-changed or easily changed. In addition, the present disclosure will also include techniques that may be easily modified and implemented by using the embodiments. While the present disclosure has been described with reference to embodiments thereof, it will be apparent to those of ordinary skill in the art that various changes and modifications may be made thereto without departing from the spirit and scope of the disclosure as set forth in the following claims.

What is claimed is:

1. An operation method of an electronic device that stores a first setup value for a first function of an external device that stores setup backup data, comprising:

establishing a connection to the external device;

receiving, in response to the establishing of the connection to the external device, a first setup backup value included in the setup backup data from the external device; and updating the first setup value based on the first setup backup value, wherein after the establishing of the connection and before the receiving of the first setup backup value, the operation method further comprises:

discovering services supported by the external device;

discovering, when a device setup service is supported by the external device, characteristics included in the setup backup data; and transmitting, when a first characteristic applicable to the electronic device is included in the characteristics, a read request for a value of the first characteristic to the external device.

2. The operation method of claim 1, further comprising:

receiving, from the external device, a first setup request value provided to the external device from a user; and updating the first setup value based on the first setup request value.

3. The operation method of claim 1, further comprising receiving a second setup request value from a user;

updating the first setup value based on the second setup request value; and transmitting the second setup request value to the external device, so that the first setup backup value is updated.

4. The operation method of claim 3, wherein the transmitting of the second setup request value to the external device includes:
determining whether the setup backup data includes the first characteristic corresponding to the first function; and
transmitting, when it is determined that the setup backup data includes the first characteristic, a write request of the second setup request value for the first characteristic to the external device.

5. The operation method of claim 1, further comprising:
storing the setup backup data including the first setup backup value at a second time point before a first time point at which the connection is established.

6. The operation method of claim 1, wherein:
the electronic device is configured to communicate with the external device through a Bluetooth protocol, and
the device setup service is implemented based on a Generic Attribute Profile (GATT).

7. The operation method of claim 6, wherein each of the characteristics included in the setup backup data has at least one of a read property and a write property.

8. The operation method of claim 1, wherein the electronic device is configured to control the first function of the external device based on the first setup value.

9. An operation method of a peripheral device that stores setup backup data including a first setup backup value for a first function, the operation method comprising:
establishing a first connection to a first central device storing a first setup value for the first function; and
receiving a first discovery request for services supported by the peripheral device;
providing a service list indicating the services supported by the peripheral device to the first central device;
receiving a second discovery request for characteristics included in a device setup service;
providing a characteristic list indicating the characteristics included in the device setup service to the first central device;
receiving a read request for a value of a characteristic corresponding to the first function from the first central device; and
providing the first setup backup value to the first central device to update the first setup value with the first setup backup value in response to the read request.

10. The operation method of claim 9, further comprising:
updating the first setup backup value in response to a first setup request value provided by a user; and
providing the first setup backup value to the first central device to update the first setup value.

11. The operation method of claim 9, further comprising:
receiving, from the first central device, a second setup request value provided to the first central device from a user; and
updating the first setup backup value based on the second setup request value.

12. The operation method of claim 9, further comprising:
establishing a second connection to a second central device storing a second setup value for the first function; and
providing the first setup backup value to the second central device to update the second setup value in response to the second connection being established.

13. The operation method of claim 12, wherein:
the first central device is configured to control the first function of the peripheral device based on the first setup value, and
the second central device is configured to control the first function of the peripheral device based on the second setup value.

14. The operation method of claim 13, wherein each of the first central device and the second central device is configured to exclusively control the first function of the peripheral device.

15. An operation method of an electronic device that communicates with an external device, wherein the electronic device is configured to store a first setup value for a first function of the external device that stores setup backup data, comprising:
establishing a connection to the external device;
discovering services supported by the external device;
determining whether the services include a device setup service;
discovering, in response to the determining that the services include the device setup service, characteristics included in the device setup service;
reading a value of a first characteristic that is one of the characteristics included in the device setup service and corresponds to the first setup value;
controlling the first function of the external device based on the value of the first characteristic;
receiving a first setup request value from a user;
updating the first setup value based on the first setup request value; and
determining whether the setup backup data includes the first characteristic corresponding to the first function; and
transmitting, when it is determined that the setup backup data includes the first characteristic, a write request of the first setup request value for the first characteristic to the external device to update a first setup backup value included in the setup backup data.

16. The operation method of claim 15, wherein the controlling of the first function of the external device includes:
updating the first setup value based on the value of the first characteristic.

17. The operation method of claim 16, further comprising:
receiving a first setup request value from the external device; and
updating the first setup value based on the first setup request value.

* * * * *